(12) United States Patent
Frey

(10) Patent No.: US 6,658,852 B2
(45) Date of Patent: Dec. 9, 2003

(54) MOTOR VEHICLE DRIVE

(75) Inventor: Juergen Frey, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/989,689

(22) Filed: Nov. 21, 2001

(65) Prior Publication Data

US 2002/0108373 A1 Aug. 15, 2002

(30) Foreign Application Priority Data

Nov. 22, 2000 (DE) .......................................... 100 57 798

(51) Int. Cl.$^7$ ................................................ F01B 21/04
(52) U.S. Cl. ........................................ 60/716; 60/698
(58) Field of Search .................... 60/698, 716; 180/2.1, 180/65.4, 65.2, 65.3, 65.5

(56) References Cited

U.S. PATENT DOCUMENTS

| 5,582,262 A | * | 12/1996 | Wust ........................... 180/2.1 |
| 5,755,303 A | | 5/1998 | Yamamoto et al. |
| 6,098,733 A | * | 8/2000 | Ibaraki et al. ............. 180/65.2 |
| 6,365,983 B1 | * | 4/2002 | Masberg et al. .......... 490/40 C |
| 6,371,878 B1 | * | 4/2002 | Bowen .......................... 475/5 |
| 6,394,924 B1 | * | 5/2002 | Schiebold et al. ............. 475/5 |

FOREIGN PATENT DOCUMENTS

| DE | 2943554 | 8/1985 |
| DE | 19632074 | 2/1998 |
| DE | 9422162 | 8/1998 |
| DE | 19953940 | 5/2000 |
| DE | 19953587 | 2/2001 |
| EP | 0649769 | 12/1996 |
| EP | 1097831 | 5/2001 |

* cited by examiner

Primary Examiner—Hoang Nguyen
(74) Attorney, Agent, or Firm—Crowell & Moring LLP

(57) ABSTRACT

A motor vehicle drive includes an internal-combustion engine, at least one electric machine, and a clutch device by which the electric machine can be connected in a drive relationship with the internal-combustion engine. At least one auxiliary device (34, 36) can be connected in a drive relationship with the electric machine.

13 Claims, 2 Drawing Sheets

MOTOR VEHICLE DRIVE

BACKGROUND AND SUMMARY OF THE INVENTION

This application claims the priority of German patent document 100 57 798.9, filed Nov. 22, 2000, the disclosure of which is expressly incorporated by reference herein.

The invention relates to a motor vehicle drive which includes an internal combustion engine and at least one electric starter motor.

In a motor vehicle drive of this type disclosed in German Patent Document DE 196 32 074 A1, a starter generator, which has a rotor constructed as a flywheel, can be coupled with an internal-combustion engine in order to start it. After the start, the starter generator functions as a dynamo or a generator, for charging an electric battery. The generator may be driven from either the forward or the rearward end of the crankshaft of the internal-combustion engine.

German Registered Utility Model DE 94 22 162 U1 shows a motor vehicle hybrid drive with a series connection consisting of an internal-combustion engine, a first clutch, a transmission, a second clutch and a vehicle axle. Between the two clutches, an electric machine is connected in a drive relationship with the transmission. The electric machine can be operated as an electric motor, as a generator, as an electromagnetic brake and as a starter for starting the internal-combustion engine. For generating current at low vehicle speeds of, for example, from 0 to 50 km/h, where the internal-combustion engine is not used to propel the motor vehicle, an additional generator is required which is driven by the crankshaft of the internal-combustion engine.

German Patent Document DE 29 43 554 A1 shows a motor vehicle hybrid drive having an electric machine which can be supplied with electric energy from an electric energy accumulator or feeds electric energy back into the energy accumulator. The electric machine is connected with a driving axle of a motor vehicle via a first separating clutch and with an internal-combustion engine arranged in series therewith, via a second separating clutch. According to the requirement, only one of two or both separating clutches are opened or closed.

European Patent Document EP 0 649 769 A1 shows a driving device which can be connected to an external power supply system for transport devices, such as a trolley bus or a streetcar with an external power supply by an overhead line, or a railroad with an external electric power supply. The driving device contains an electric travelling device motor which can be supplied with current alternatively by an external power supply system or by a generator present in the vehicle, which generator can be driven by an internal-combustion engine. With respect to the drive, the generator is mechanically constantly connected with auxiliaries.

Drives in which energy for propulsion is generated by an internal-combustion engine and by at least one electric motor are generally called "hybrid drives". This invention also is such a hybrid drive.

One object of the invention is to construct a hybrid motor vehicle drive which is structurally simple.

Another object of the invention is to provide such a hybrid drive which has a low weight.

Still another object of the invention is to provide such a hybrid drive which consumes less energy.

These and other objects and advantages are achieved by the motor vehicle hybrid drive according to the invention, which includes an internal-combustion engine and at least one electric machine which can be operated as a starter for starting the internal-combustion engine or as a generator. The electric machine can be uncoupled from the internal-combustion engine or can be connected in a drive relationship with it, via a first clutch; and an auxiliary equipment drive path is provided from the electric machine to drive at least one auxiliary device (such as an air conditioner compressor, a hydraulic or electric drive for a cable winch, or other similar devices on the vehicle).

This configuration has the advantage that the electric machine can operate as a motor and can drive the auxiliary equipment when the internal-combustion engine is switched off. Alternatively, when the internal-combustion engine is switched on, it can drive the electric machine for generating power for charging a power accumulator.

According to a preferred embodiment, the auxiliary equipment driving path contains a second clutch which can connect the at least one auxiliary device in a drive relationship with the electric machine, or can separate it from the electric machine.

This feature has the advantage that auxiliary devices which require a particularly large amount of driving power can be uncoupled from the electric machine and from the internal-combustion engine. On the other hand, when the electric machine operates as a starter motor, it can be used for starting the internal-combustion engine; and when the electric machine drives the motor vehicle, in addition to or without the switched-on internal-combustion engine (for example, when the internal-combustion engine is switched off, in the low vehicle speed range between 0 km/h and 50 km/h, or when the internal-combustion engine is switched on, in addition to the latter), it supplies propulsive power in driving situations in which a particularly large amount of driving power is required (for example, during a passing maneuver or on a particularly steep hill). Auxiliary devices which require significantly more driving power than other auxiliary devices are, for example, refrigerant compressors for a motor vehicle air-conditioning system or hydraulic or electric drives for a cable winch or other working apparatuses provided on the motor vehicle. In addition, the uncoupling of one or more devices has the advantage that the electric machine can be smaller, providing a smaller output which is sufficient for starting the internal-combustion engine or for supplying vehicle driving energy in addition to or as an alternative to the internal-combustion engine.

A motor vehicle normally also contains other auxiliary equipment, such as a water pump or an oil pump, which require significantly less driving energy than, for example, a refrigerant compressor for compressing refrigerant of an air-conditioning system. Such auxiliary devices, which require relatively little driving energy, according to the invention can be connected to be driven by the rotor of the electric machine, so that they can be uncoupled or, according to another embodiment, so that they cannot be uncoupled.

According to another preferred embodiment of the invention, the auxiliary-aggregate driving path has two or more driving branches which have different transmission ratios. One or more auxiliary devices are connected to only one driving branch or can be connected in an optionally changeable manner with one or the other driving branch, and as a result can be connected at different driving ratios with the electric machine.

Other objects, advantages and novel features of the present invention will become apparent from the following detailed description of the invention when considered in conjunction with the accompanying drawings.

DETAILED DESCRIPTION OF THE DRAWINGS

Figure 1:
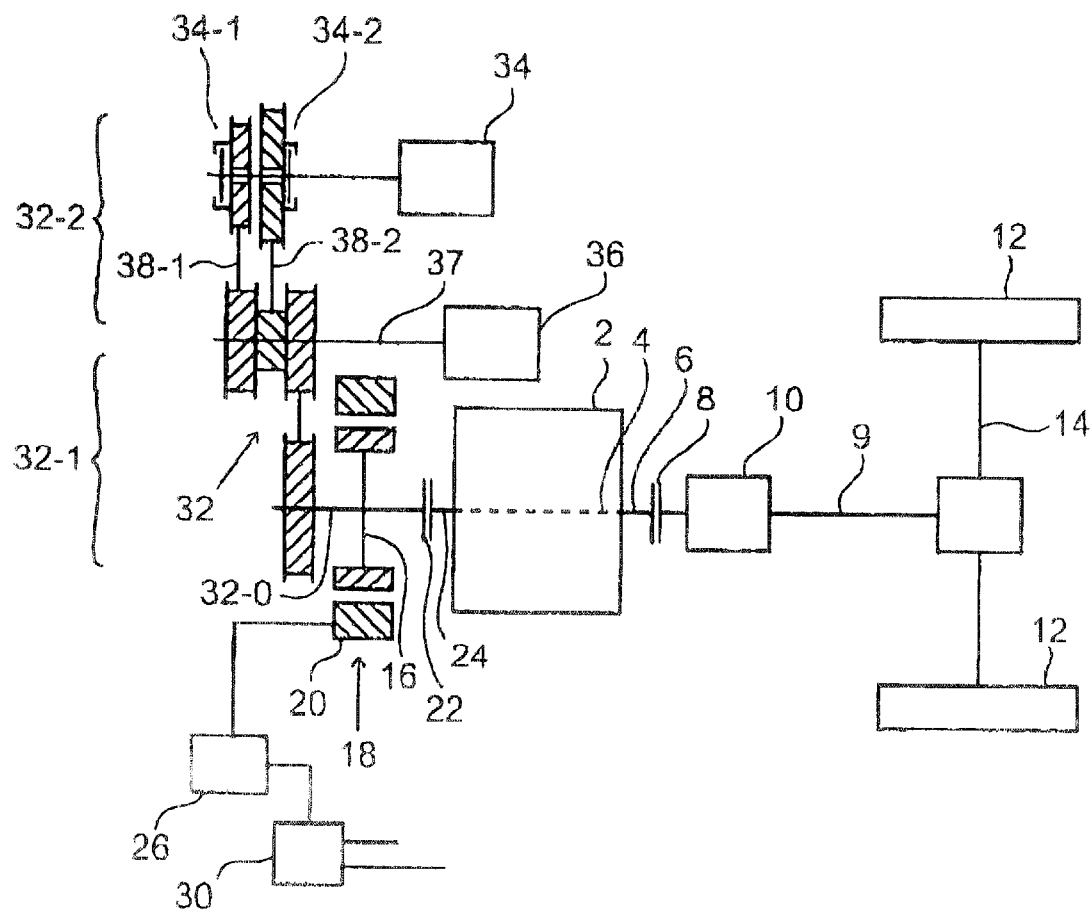
FIG. 1 is a schematic view of a motor vehicle drive according to the invention.

FIG. 1 is a view of an internal-combustion engine 2 with a crankshaft 4 whose traveling-drive-side rearward end 6 can be coupled by way of a traveling drive clutch 8 of a vehicle drive train 9 with a traveling drive clutch 10 for driving wheels 12 of a vehicle axle 14. The latter may be a front wheel axle or a rear wheel axle of a motor vehicle.

A rotor 16 of an electric motor 18 is arranged rotatably relative to a stator 20, and axially with respect to the crankshaft 4 of the internal-combustion engine 2. It can be coupled (that is, can be connected or separated with respect to the drive) via a first clutch 22 with the forward end 24 of the crankshaft 4 as a function of operating situations. When the first clutch 22 is closed, the electric machine 18 can operate as a starter for starting the internal-combustion engine 2 or as a generator which is driven by the internal-combustion engine 2 for generating current and for storing current in a current accumulator 26, such as a battery, from which the electric machine 18 obtains electric energy when it is operated as a starter. Moreover, when the first clutch 22 is closed, the electric machine 18 can drive the vehicle wheels 12 of the vehicle axles 14, either when the internal-combustion engine 2 is switched on, can support its driving torque or, when the internal-combustion engine is switched off, without a driving torque by the internal-combustion engine 2. In addition, when the first clutch device 22 is closed, the electric machine 18 can also be used as an electromagnetic vehicle brake. The control of the electric machine 18 and of the internal-combustion engine 2 takes place by an electronic control 30.

The first clutch device 22 preferably can also be shifted during its rotation and torque transmission. For example, it may be a multi-plate clutch which can be shifted by the electronic control device 30 or a centrifugal force clutch (preferably a centrifugal clutch) which is self-locking in both rotating directions. At least one auxiliary equipment drive path 32 is connected to be driven by the rotor 16 of the electric machine 18, preferably on its forward side facing away from the first clutch device 22, for driving at least one auxiliary device. As shown in FIG. 1, a first auxiliary device 34 and a second auxiliary aggregate 36 are driven by the electric machine 18 and/or the internal-combustion engine 2. The first auxiliary device 34 may be, for example, a refrigerant compressor of an air-conditioning system of a motor vehicle, while the second auxiliary device 36 is, for example, a water pump for the water cooling of the internal-combustion engine 2. Instead or in addition, one or several oil pumps or apparatuses can also be connected or be connectable as auxiliary equipment to be driven by the auxiliary equipment drive train.

The auxiliary equipment driving path of FIG. 1 contains one second clutch device 34-1, 34-2 by means of which at least the first auxiliary device 34 can be coupled and uncoupled via the auxiliary device driving path 32 with the electric machine 18. The second auxiliary device 36 is shown in FIG. 1 as being fixedly connected in a drive relationship with the auxiliary device driving path 32; that is, it cannot be uncoupled. However, the second auxiliary device 36 can also be arranged so that it can be uncoupled.

The auxiliary equipment driving path has at least two driving stages 32-1 and 32-2. The second auxiliary device 36 is arranged at the end of the first driving stage 32-1 coaxially with respect to an intermediate shaft 37 and is non-rotatably connected with the latter. At the end of the second stage 32-2, the first auxiliary device 34 can be coupled and uncoupled via the second clutch device 34-1, 34-2 to the auxiliary equipment driving path 32 as a function of the control device 30.

In the second stage 32-2, the auxiliary equipment driving branch 32 has two driving branches 38-1 and 38-2 which have different ratios, so that the first auxiliary device 34 can be driven by way of a clutch 34-1 of the second clutch device at a different driving ratio than by way of a second clutch 34-2 of the second clutch device 34-1, 34-2. The first auxiliary device 34 is arranged axially with respect to the axis of rotation of the two clutches 34-1 and 34-2.

Figure 2:
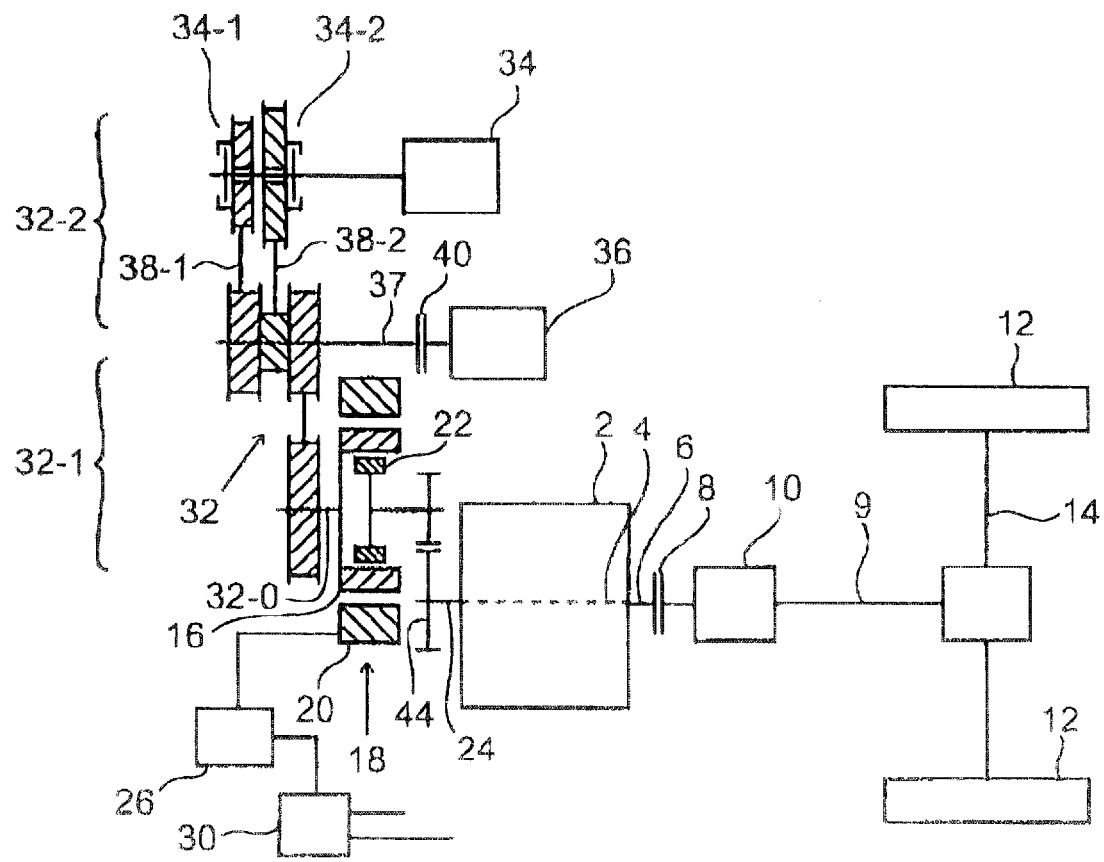
FIG. 2 is a schematic view of another motor vehicle drive according to the invention.

According to another embodiment (not shown), in the case of the motor vehicle drives of FIGS. 1 and 2, in addition to or alternatively to the second clutch device 34-1, 34-2, a shiftable clutch may be provided between the rotor 16 of the electric machine 18 and the input 32-0 of the auxiliary-aggregate driving path.

The embodiment of FIG. 2 differs from that of FIG. 1 only by the fact that the possibility is additionally shown of coupling or uncoupling also the second auxiliary aggregate 36 by way of a shiftable third clutch device 40 with the auxiliary-aggregate driving path 32. Furthermore, FIG. 2 shows the possibility, which can be used as an alternative or simultaneously, of integrating the first coupling device 22 in the rotor 16 of the electric machine 18 and/or inserting an intermediate stage 44 (transmission, belt or chain drive) into the driving connection between the rotor 18 and the crankshaft 4. This intermediate stage may be arranged between the crankshaft 4 and the first clutch device 22, as illustrated in FIG. 2. However, in the case of the embodiment according to FIG. 1, it is also possible instead to provide such a transmission ratio 44 between the first clutch device 22 and the rotor 16. FIG. 2 shows the intermediate stage 44 which is connected to be driven by the forward end 24 of the crankshaft 4. Instead, this intermediate stage 44 may also be connected or connectable to be driven in a fixed manner with the traveling-drive-side reward end 6 of the crankshaft or by way of a clutch 22.

FIG. 2 illustrates that it is also possible to connect only the second auxiliary device 36 by way of a clutch device 40 so that it can be coupled with the auxiliary-aggregate driving path 32, and (by omitting the second clutch device 34-1, 34-2) to connect the first auxiliary device 34 in a non-rotatable manner in which it cannot be uncoupled, with the auxiliary equipment driving path 32. In this case, the two auxiliary devices 34 and 36 can also be mutually exchanged. Furthermore, instead of two or more auxiliary devices, only a single auxiliary aggregate may be provided.

When the first clutch 22 is open, the electric machine 18 can drive the auxiliary aggregates 34 and/or 36 by way of the auxiliary-aggregate driving path 32, independently of the function of the internal-combustion engine 2 (which may be switched off, or may be switched on for driving the vehicle axle 14).

Figure 3:
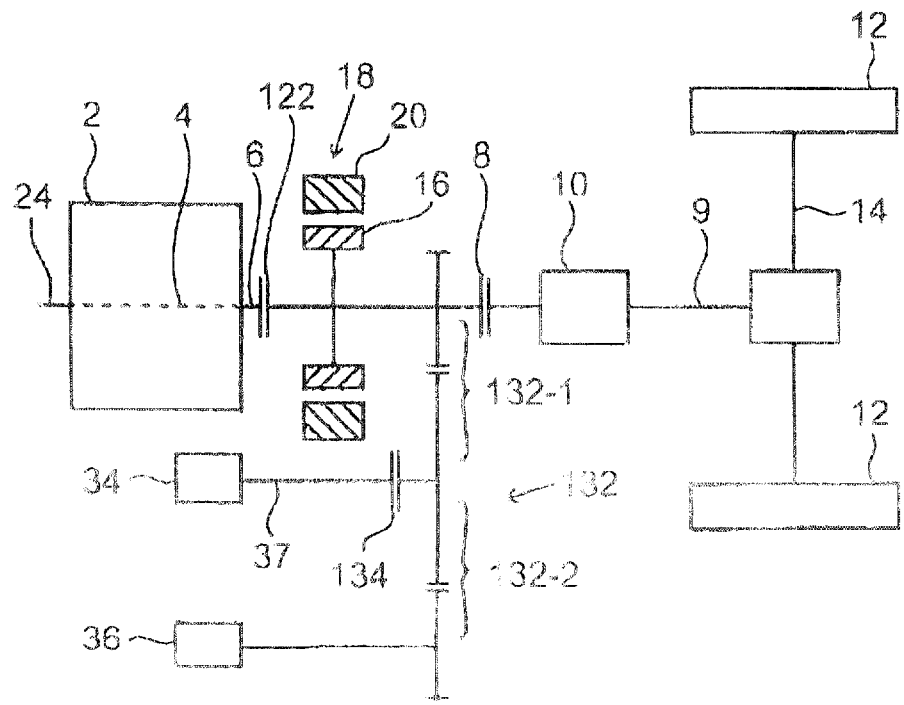
FIG. 3 is a schematic view of again another motor vehicle drive according to the invention.

The latter possibility does not exist in the embodiment of FIG. 3. Although the electric machine 18 can drive the auxiliary devices 34 and 36 independently of the internal-combustion engine 2, it can do so only when the electric machine 18 is uncoupled from the internal-combustion engine as well as from the traveling drive transmission 10. The rotor 16 of the electric machine 18 is arranged on the travelling-drive-side (rearward end) 6 of the crankshaft 4, preferably axially thereto, in the traveling drive train 9 serially between an engine-side first clutch device 122 and the transmission-side traveling drive clutch 8. As a result, both the traveling drive clutch 8 and the first clutch 122 must be sufficiently strong to transmit the entire traveling drive torque. This means that the first clutch device 122 of FIG. 3 must be significantly stronger than the first clutch device 22 of FIG. 1 and FIG. 2.

The auxiliary-aggregate driving path 132 of FIG. 3 is a two-stage transmission with a first stage 132-1 and a second stage 132-2. The first auxiliary aggregate 34 and the controllable second clutch device 134 required for their coupling to the auxiliary-aggregate driving path 132 are arranged coaxially with respect to the intermediate drive shaft 36. The second auxiliary aggregate 36 is fixedly (or by a shiftable clutch) connected in a drive relationship with the end of the second stage 132-2.

In all embodiments of the invention, controlled by the electronic control device 30, a) the electric machine 18 can be operated as a starter for starting the internal-combustion engine 2; b) the electric machine 18 can be operated as a generator for generating current by the internal-combustion engine 2; and c) the motor vehicle in the city can be operated in a stopping and traveling mode. In the latter case, c1) the internal-combustion engine can be switched off during the stop phase, and the at least one auxiliary device 34 and/or 36 can be driven by the electric machine, which in this case can be operated as an electric motor and can be supplied with current by the current source 26, in which case further c2), at the end of the stop phase, the internal-combustion engine 2 can be started by the electric machine 18 which now can be operated as a starter, and in which case c3) while the internal-combustion engine is running for the driving phase, the electric machine 18 and the at least one auxiliary device 34 and/or 36 can be driven by the internal-combustion engine 2. Here, the electric machine can run along idle depending on the embodiment or driving situation or can be operated as a generator for generating current.

When a centrifugal clutch is provided as the first clutch device 22 of FIGS. 1 and 2 or 122 of FIG. 3, it closes as a function of rotational rotor speed. Thus, an impulse start of the internal-combustion engine 2 can be implemented in a simple manner. Below this rotational rotor speed, no force transmission takes place from the electric machine 18 to the crankshaft 4, and the auxiliary devices can be driven by the electric machine 18, both while the internal-combustion engine 2 is running and when the internal-combustion engine is switched off. By using ratio stages in the auxiliary-equipment drive path 32 or 132 respectively, the auxiliary devices 34 and 36, the electric machine 18 and the internal-combustion engine 2 can be operated at least approximately in their optimal rotational speed ranges and optimal load ranges.

As used herein, the word "ratios" indicates a ratio of rotational speeds upward and downward (stepping-down) depending on the requirements in practice.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit for a motor vehicle, comprising:
   an internal-combustion engine which is mechanically connectable to vehicle wheels via a traveling drive train for driving said vehicle;
   at least one electric machine which is operable alternatively as a starter for starting the internal-combustion engine and as a generator;
   a first drive path including a first clutch by which the electric machine can be alternatively uncoupled from, and connected in drive relationship with, the internal-combustion engine and the traveling drive train; and
   an auxiliary equipment drive path separate from said first drive path and from the traveling drive train, which auxiliary equipment drive path transmits mechanical drive force from the electric machine to at least one mechanically driven auxiliary device, by means of which the auxiliary device can be driven.

2. The unit according to claim 1, wherein the auxiliary equipment drive path contains a second clutch by which the at least one auxiliary device can alternatively be connected in drive relationship with or can be separated from the electric machine.

3. The drive unit according to claim 1, further comprising at least one second auxiliary device connected or connectable with the auxiliary equipment drive path.

4. The drive unit according to claim 3, wherein
   the auxiliary equipment drive path has at least two driving stages;
   one of the auxiliary devices is connected or connectable in a drive relationship with an end of the first driving stage; and
   the other auxiliary device is connected or connectable in a drive relationship with an end of the second stage with the auxiliary equipment driving path.

5. The drive unit according to claim 3, wherein
   the auxiliary equipment drive path has two driving branches which have different transmission ratios;
   one of the auxiliary devices can be coupled by means of the second coupling device alternatively with either of the two driving branches in order to connect said one of the auxiliary devices with the auxiliary equipment drive path.

6. The drive unit according to claim 4, wherein the second driving stage has the two driving branches.

7. The drive unit according to claim 1, wherein the electric machine is operable as an electric motor.

8. The drive unit according to claim 1, wherein the electric machine is operable as an electromagnetic engine brake.

9. The drive unit according to claim 1, wherein:
   a crankshaft of the internal-combustion engine has a first end which is mechanically connectable with the traveling drive train for propelling the vehicle, and a second end; and
   the electric machine is mechanically connectable via the first clutch, in a drive relationship with the second end of the crankshaft.

10. The drive unit according to claim 1, wherein at least one driving stage is formed between the internal-combustion engine and the electric machine.

11. The drive unit according to claim 1, further comprising an electronic control unit connected to the electric machine and the internal-combustion engine wherein:
    the electric machine is operable as a starter for starting the internal-combustion engine, and as a generator for generating current by the internal-combustion engine;

the motor vehicle is operable in a stopping and traveling mode; and when the motor vehicle is in the stopping and traveling mode, the internal-combustion engine can be switched off during a stop phase, and the at least one auxiliary device can be driven by the electric machine operating as an electric motor supplied with electric current by a current source, at the end of the stop phase, the internal-combustion engine can be started by the electric machine operating as a starter, and while the internal-combustion engine is running for the driving phase, the electric machine and the at least one auxiliary device can be driven by the internal-combustion engine.

12. The drive unit according to claim 1, wherein the first clutch device is a centrifugal clutch which is self-locking at least in one rotating direction.

13. The drive unit according to claim 12, wherein the first clutch device is a centrifugal clutch which is self-locking in both rotating directions.

* * * * *